_US006880861B2_

(12) United States Patent
Muroi et al.

(10) Patent No.: US 6,880,861 B2
(45) Date of Patent: Apr. 19, 2005

(54) PIPE JOINT

(75) Inventors: Akira Muroi, Saitama (JP); Hitoshi Muroi, Saitama (JP); Tateyuki Kuwata, Saitama (JP); Mitsuhiro Oyama, Saitama (JP); Shinsaku Taneda, Saitama (JP)

(73) Assignee: Tozen Corporation, Saitama (JP)

( * ) Notice: Subject to any disclaimer, the term of this patent is extended or adjusted under 35 U.S.C. 154(b) by 0 days.

(21) Appl. No.: 10/696,035

(22) Filed: Oct. 30, 2003

(65) Prior Publication Data

US 2005/0006895 A1 Jan. 13, 2005

(30) Foreign Application Priority Data

Jul. 7, 2003 (JP) ........................................ 2003-192716

(51) Int. Cl.⁷ .............................................. F16L 21/00
(52) U.S. Cl. ........................ 285/226; 285/300; 285/301
(58) Field of Search ................................ 285/301, 300, 285/226–229, 903; 138/121, 173

(56) References Cited

U.S. PATENT DOCUMENTS

| | | | | |
|---|---|---|---|---|
| 2,434,224 A | * | 1/1948 | Paul | 285/226 |
| 3,976,312 A | * | 8/1976 | Murphree | 285/226 |
| 5,749,609 A | * | 5/1998 | Steele | 285/226 |
| 6,514,146 B1 | * | 2/2003 | Shinozuka | 464/79 |
| 6,631,928 B1 | * | 10/2003 | Sakata | 285/226 |
| 6,681,808 B1 | * | 1/2004 | Takaara | 138/121 |

FOREIGN PATENT DOCUMENTS

| | | | | |
|---|---|---|---|---|
| CA | 650450 | * | 10/1962 | 285/301 |
| DE | 2808135 A1 | * | 8/1979 | 285/226 |
| GB | 759306 | * | 10/1956 | 285/226 |
| SU | 1809231 A1 | * | 4/1993 | 285/226 |

* cited by examiner

Primary Examiner—Aaron Dunwoody
(74) Attorney, Agent, or Firm—Rader, Fishman & Grauer PLLC

(57) ABSTRACT

This pipe joint comprises a hollow cylindrical joint body made of elastic material such as heat-resistant rubber with a prescribed length, and a circular flange for connecting piping attached to the both sides of the joint body, on the side of the inner circumference of the joint body is provided a bellows metal pipe closely contacted with the joint body, and the thickness of the joint body is at least larger than the size of the summit or the trough of bellows of the metal pipe.

7 Claims, 4 Drawing Sheets

// PIPE JOINT

FIELD OF THE INVENTION

The present invention relates to a pipe joint connecting piping used for fluid circulation.

BACKGROUND OF THE INVENTION

A pipe joint 51 according to the conventional technology comprises, as shown in FIG. 7, a hollow cylindrical joint body 52 made of elastic material such as heat-resistant rubber with a prescribed length, and a circular flange 55 for connecting piping attached onto the both ends of the joint body 52. The flange 55 is metallic and is fitted into and attached to the both ends of the joint body 52 in a way that the both ends of the joint body 52 are elastically deformed inwardly to make their diameter smaller. In order to maintain the capacity of the joint body 52 to resist pressure, a reinforcement member 60 such as synthetic fiber is embedded at a prescribed position in the joint body 52. The reference numeral 58 is a stopper member for maintaining capacity to resist pressure attached to the two flanges 55 connecting one flange to another therewith according to necessity. The reference numeral 61 is a reinforcement ring attached on both ends of the reinforcement member 60 and is provided to fit into the concave sections cut-away and formed on both flanges 55, together with the both ends of the reinforcement member 60.

It is to be noted that the conventional pipe joint 51 has the configuration, as described above, in which the joint body 52 is embedded with the reinforcement member 60, so that a complicated works such as positioning of the reinforcement member 60 and reinforcement rings 61 has been necessary in the formation of the joint body 52, which requires time as well as cost in the formation. Further the quality control has been also difficult.

SUMMARY OF THE INVENTION

The object of the present invention is, in view of the problems described above, to provide a pipe joint not requiring a reinforcement member, capable of simplifying works and expediting the formation, as well as keeping a certain level of quality and being maintained easily. In order to achieve the object described above, the pipe joint according to this invention is characterized in that the pipe joint comprises a hollow cylindrical joint body made of elastic material such as heat-resistant rubber with a prescribed length, and a circular flange for connecting piping attached onto the both ends of the joint body; on the side of the inner circumference of the joint body is provided a bellows metal pipe closely contacted with the joint body; and the thickness of the joint body is at least larger than the size of summit and trough of bellows of the metal pipe.

The pipe joint according to this invention has the configuration as described above so that it is not necessary to embed a reinforcement member into the joint body as in the conventional technology. Further, the pipe joint according to the invention simplifies necessary works and allows a quick formation, keeping the quality at a certain level and facilitating maintenance as well.

DETAILED DESCRIPTION OF THE PREFERRED EMBODIMENTS

Figure 1:
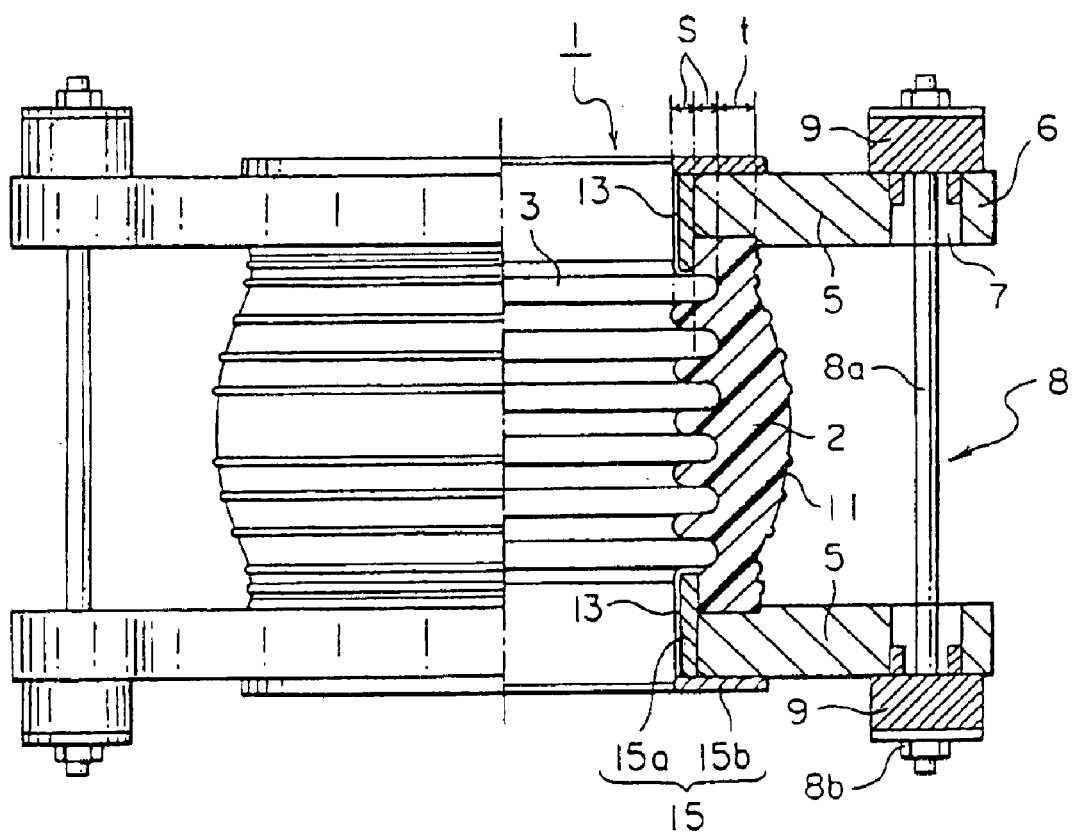
FIG. 1 is a front view with the right half broken off showing a pipe joint according to one embodiment of the present invention.

One embodiment of the present invention is described with reference to the drawings.

The reference numeral 1 is a pipe joint comprising a hollow cylindrical joint body 2 made of elastic material such as heat-resistant rubber with a prescribed length. On the side of the inner circumference of the joint body 2 is provided a bellows metal pipe 3 closely contacted with the joint body 2. Namely, the metal pipe 3 is formed with a plurality of bellows in the direction of the pipe's axis at regular intervals in the circular form, so that the inner circumference section of the joint body 2 is filled up to and closely contacted with the trough of the outer circumferential surface. On the both sides of the metal pipe 3 and the joint body 2 (upward and downward in FIG. 1) is each attached a metal circular flange 5 for connecting piping. On the flange 5 is formed an expanded section 6 at a position opposing to each other, and into the expanded section is bored a piercing hole 7, and between the two piercing holes 7 is attached a stopper member 8 for maintaining capacity to resist pressure comprising a through bolt 8a and a nut 8b. The reference numeral 9 is a rubber-made bush having at its center a hole for penetrating a bolt 8a and also having a leg section for fitting into the piercing hole 7, which is an intermediate serving as a buffer to prevent vibration. The reference numeral 10 is a piercing hole for connecting piping plurally provided in the direction of the circumference of the flange 5 at prescribed intervals.

On the outer circumferential surface of the joint body 2 is formed a convex section 11 curving in the form of a convex gradually from its both ends toward its central part, making a nonlinear-like surface. Further the substantial thickness t of the joint body 2 is larger than the size s of the summit or the trough of bellows of the metal pipe 3 at any part of the convex section 11.

Each of both ends of the metal pipe 3 connected with the bellows forms a flat section 13, and on the flat section 13 is provided a circular attachment seat 15 with its section being L-shaped. The attachment seat 15 comprises a small cylindrical pipe 15a and a circular plate 15b fixed by welding to a tip of the open side of the small cylindrical pipe 15a, and the circular plate 15b is contacted with the surface of the outer side of the flange 5 while the small cylindrical pipe 15a is fixed and attached to the inner circumferential surface of the flange 5. Further, the flat section 13 of the metal pipe 3 covers all over the inner circumferential surface of the small cylindrical pipe 15a. The use of the attachment seat 15 as described above makes it easy to attach the bellows metal pipe 3 to the flange 5. The attachment seat 15 is a preferred example for an illustrative purpose and a configuration other than those shown in the drawings is allowable.

With the configuration described above, the pipe joint according to the present invention maintains the internal pressure of fluid with the bellows metal pipe 3, the joint body 2 formed to be closely contacted therewith and to have a large thickness, and the stopper member 8, which makes it unnecessary to embed a reinforcement member into the joint body 2 as in the conventional technology, facilitating necessary works such as forming the joint body 2, and allowing to provide a product on a certain level at a lower cost.

Figure 2:
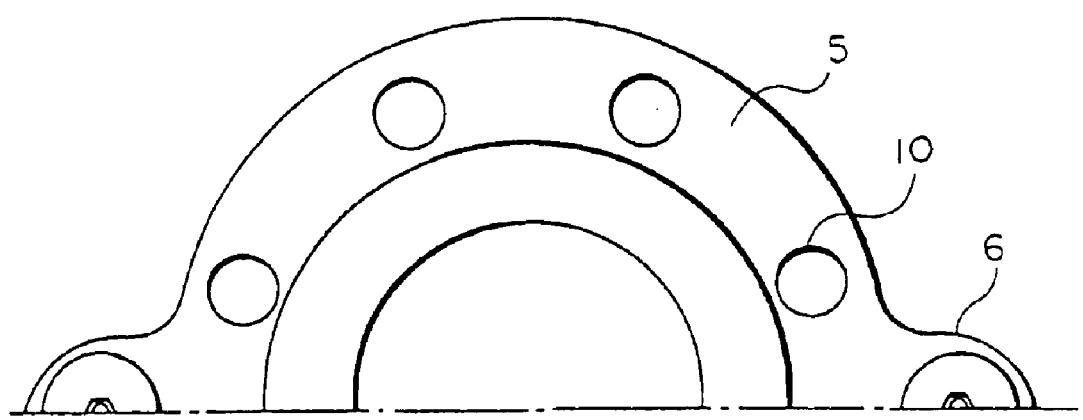
FIG. 2 is a front view showing a pipe joint with its half omitted.
Figure 3:
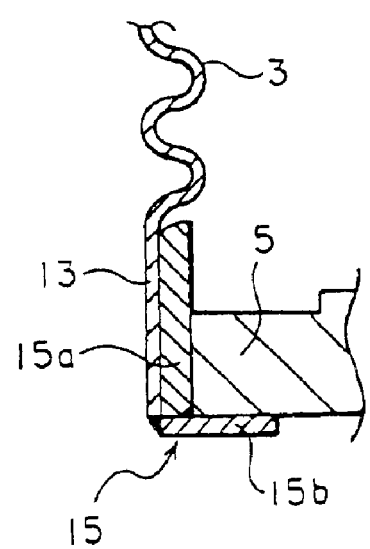
FIG. 3 is an enlarged cross-sectional view showing an attachment section of a bellows metal pipe and a flange.
Figure 4:
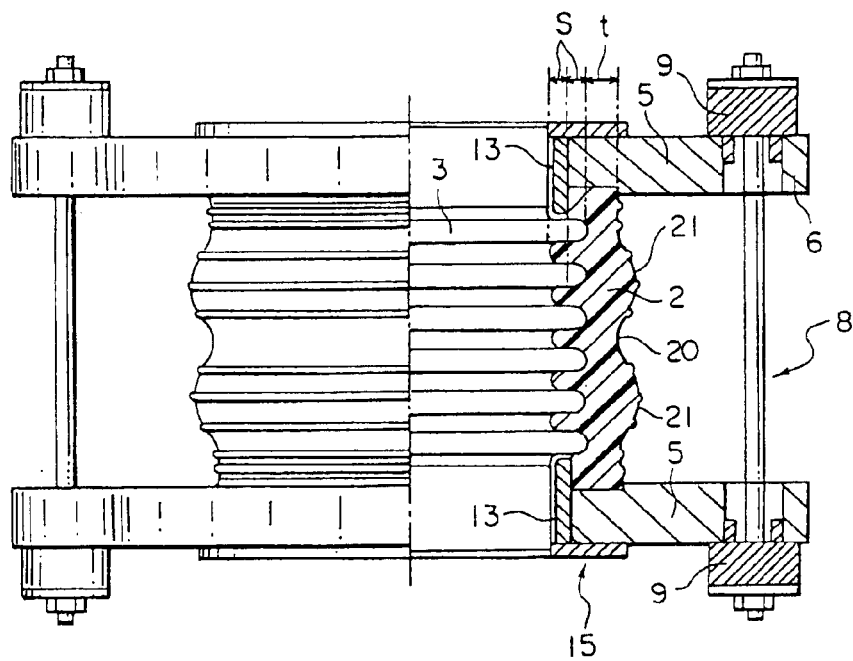
FIG. 4 is a front view with the right half broken off showing a pipe joint according to another embodiment.

FIG. 4 shows another embodiment and what is different from those shown in FIGS. 1 to 3 is that at the center of on the outer circumferential surface of the joint body 2 is formed a concave section 20 and that on the both sides of the concave section are formed two curved convex sections 21, making a nonlinear-like surface. The configuration other than that is the same as the embodiment described above. The substantial thickness t of the joint body 2 is also larger than the size s of the summit or the trough of bellows of the metal pipe 3 at any part of the convex section 21 and the concave section 20 respectively.

Figure 5:
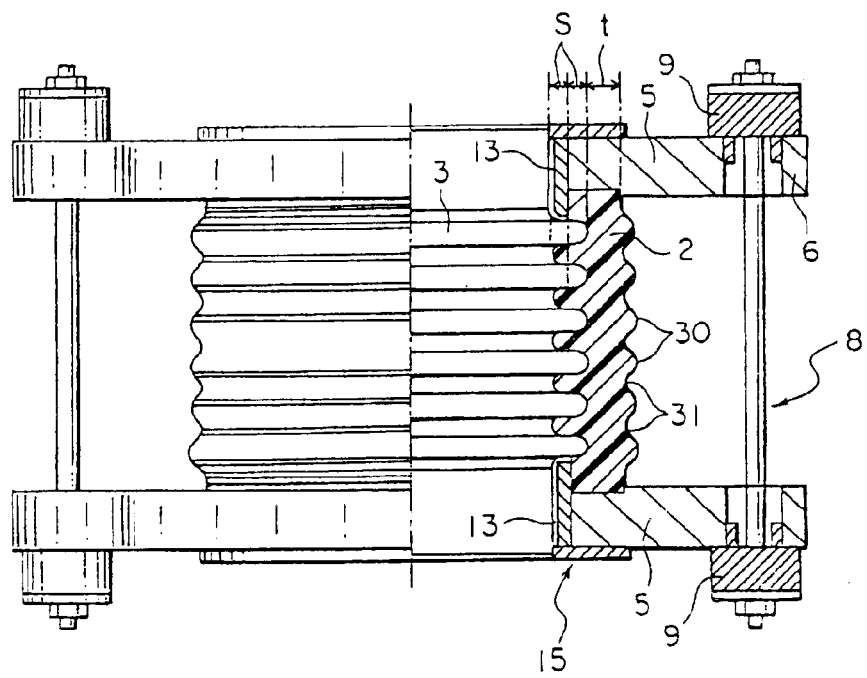
FIG. 5 is a front view with the right half broken off showing a pipe joint according to still another embodiment.

FIG. 5 shows still another embodiment and what is different from those described above is that the outer circumferential surface of the joint body 2 forms a plurality of convex sections 30 and concave sections 31 making a nonlinear-like surface, and each convex section and concave section is positioned corresponding to the summit and the trough of bellows of the metal pipe 3 respectively. The configuration other than that is the same as the embodiments described above. The substantial thickness t of the joint body 2 is also larger than the size s of the summit or the trough of bellows of the metal pipe 3 at any part of the convex section 30 and the concave section 31.

Figure 6:
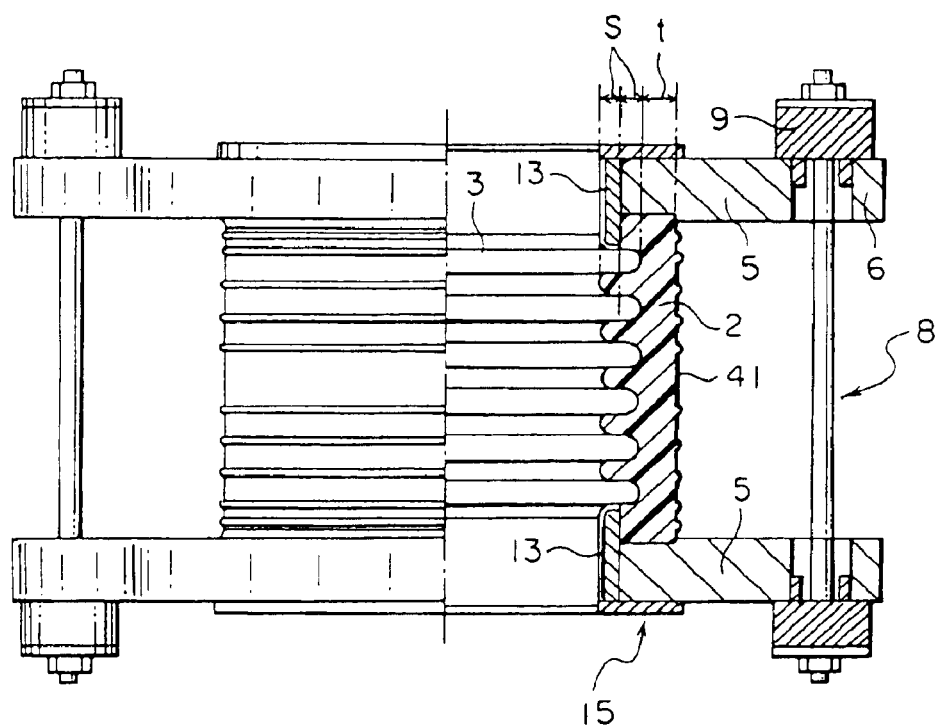
FIG. 6 is a front view with the right half broken off showing a pipe joint according to still yet another embodiment.
Figure 7:
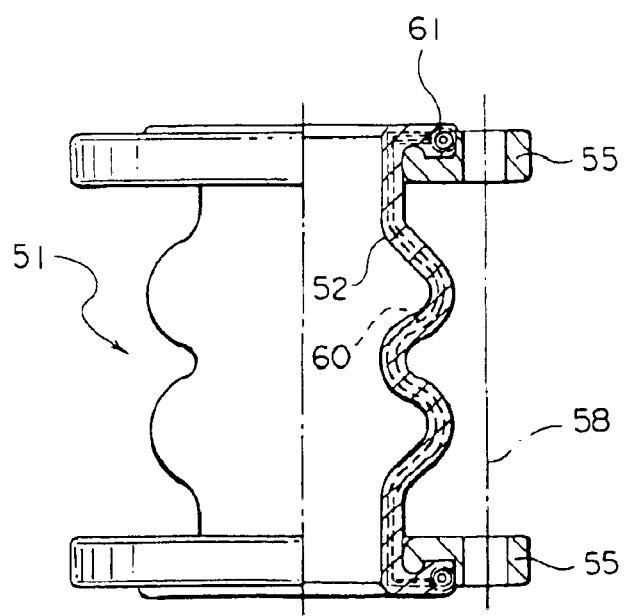
FIG. 7 is a front view with the right half broken off showing a pipe joint according to the conventional technology.

FIG. 6 shows still yet another embodiment and what is different from those described above is that the outer circumferential surface of the joint body 2 does not form a convex section nor a concave section, making a linear-like surface 41. The configuration other than that is the same as the embodiments described above. The substantial thickness t of the joint body 2 is also larger than the size s of the summit or the trough of bellows of the metal pipe 3 at any part of the linear-like surface 41.

The pipe joint described above in each embodiment is expected to have working effects of the same kind as that of the embodiments described above.

It is to be noted that each embodiment described above is only shown as a preferred example and it is optional to make the bellows of the metal pipe 3 not circular but spiral, to give any designed value for the number of the bellows or the size of the summit and the trough, to make a configuration in which the stopper member 8 is not needed when the internal pressure of fluid is low and the like, so that various changes and modifications are possible in the implementation of this invention.

What is claimed is:

1. A pipe joint comprising a hollow cylindrical joint body made of elastic material with a prescribed length and a circular flange for connecting piping attached to the both ends of the joint body, a bellows metal pipe closely contacted with said joint body on the side of the inner circumference of said joint body, and a circular attachment seat with its section being L-shaped provided at each of both ends of the metal pipe, wherein the thickness of said joint body is at least larger than the size of a summit or a trough of the bellows of said metal pipe, said attachment seat includes a small cylindrical pipe and a circular plate fixed by welding to a tip of an open side of the small cylindrical pipe, the circular plate is contacted with a surface of an outer side of the flange, and the small cylindrical pipe is fixed and attached to an inner circumferential surface of the flange.

2. The pipe joint according to claim 1, wherein bellows of the bellows metal pipe is formed in the direction of the pipe's axis at regular intervals in the circular form.

3. The pipe joint according to claim 1, wherein the outer circumferential surface of the joint body is formed with at least one convex section making a nonlinear surface.

4. The pipe joint according to claim 1, wherein the outer circumferential surface of the joint body is formed with a plurality of convex sections and concave sections making a nonlinear surface, and each of said convex sections and concave sections is positioned corresponding to the summit or the trough of bellows of the metal pipe respectively.

5. The pipe joint according to claim 1, wherein the outer circumferential surface of the joint body does not have a convex section or a concave section making a linear surface.

6. The pipe joint according to claim 1, wherein a stopper member for maintaining capacity to resist pressure is attached to the two flanges connecting one flange to another therewith.

7. The pipe joint according to claim 5, wherein the stopper member comprises a through bolt and a nut.

* * * * *